Nov. 25, 1941.  D. L. WEST  2,263,938

LIGHT SENSITIVE MEASURING INSTRUMENT

Filed Aug. 31, 1940  2 Sheets-Sheet 1

INVENTOR
D.L.WEST
BY Featherstonhaugh & Co
ATTORNEYS

INVENTOR
D.L. WEST
BY Fetherstonhaugh & Co
ATTORNEYS

Patented Nov. 25, 1941

2,263,938

UNITED STATES PATENT OFFICE 2,263,938

LIGHT SENSITIVE MEASURING INSTRUMENT

Douglas L. West, Montreal, Quebec, Canada, assignor to Howard Smith Paper Mills Limited, Montreal, Quebec, Canada Application August 31, 1940, Serial No. 355,011

10 Claims. (Cl. 88—14)

This invention relates to improvements in light sensitive measuring instruments in which photoelectric cells are used in combination with a source of light and suitable indicating means for measuring the color, opacity or other characteristics of paper or other material in terms of light reflected from samples of such materials.

An important object of the invention is to provide a generally improved instrument designed so that the introduction of errors due to variations in the finish, texture, or contour of the reflecting surfaces of the samples under test is completely eliminated.

Another object is to provide an instrument in which provision is made for eliminating the introduction of errors due to deterioration of the light source to which the samples are exposed when the instrument is in use.

Another object is to provide an instrument designed to eliminate the introduction of errors that might otherwise result from variations of lamp color temperature due to changes in the value of the voltage and current applied to the filament of the lamp or light source or to changes in the resistance of the filament itself.

A further object is to provide an instrument which is relatively easy to operate, can be readily calibrated and is so designed that results obtained can be duplicated by different operators.

Proceeding now to a more detailed description reference will be had to the accompanying drawings, in which—

Figure 1:
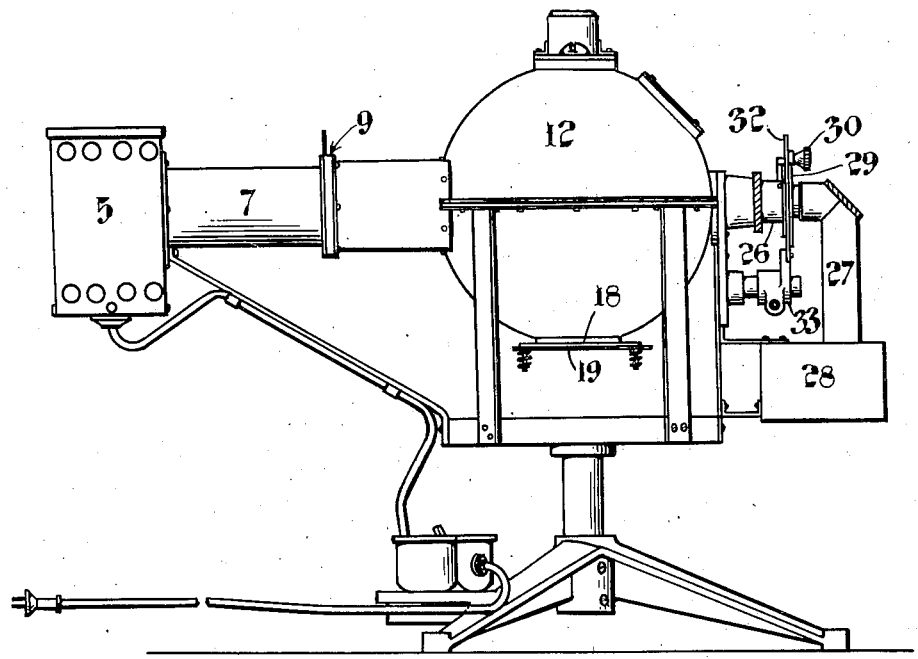
Figure 1 is a side elevation of my improved instrument.

Referring more particularly to the drawings, 5 designates a lamp casing containing a 500 watt pre-focus projection lamp 6. Light from this lamp enters a tube 7 which is blackened on the inside and has arranged therein a fixed infrared blocking filter 8, a removable filter or filter combination 9 and a condenser lens 10. The light passing through the filters and the lens emerges from the latter as a parallel collimated beam 11 which passes into the hollow integrating sphere 12 through a shield tube 13 which is blackened on the inside and prevents stray light from lens 10 striking any part of the interior of the sphere wall. At the centre of the sphere 12 the beam 11 meets a light dividing device 14, here shown as comprising an inclined mirror provided with a central opening 15. The mirror is inclined at an angle of 45° and is arranged so that part of the light of the incident beam 11 passes on through the opening 15 and leaves the sphere through the sphere opening 16 which is directly opposite the shield tube 13 and the mirror opening 15. That portion of beam 11 which is reflected by mirror 14 is deviated 90° toward a sphere opening 17 located directly below the mirror. The sample under measurement is placed over the opening 17 as indicated at 18 and may be held in place by any suitable form of sample holding table generally indicated at 19. The sample is thus illuminated with a fixed beam of light so that the reflected rays, which come off in all directions, are picked up within the integrating sphere which is provided with a white, diffusely reflecting inner surface. It is immaterial whether the intensity of the reflected light is constant in all directions as it leaves the sample because the light diffusing and integrating action of the sphere eventually results in all the light being focused at the centre of the sphere where it is picked up by the photoelectric cell 20 (hereinafter termed the "sphere cell"), which is arranged above the mirror with its light sensitive surface as close as possible to the centre of the sphere. The cell 20 should also be arranged so that its light sensitive surface is exposed only to that portion of the sphere wall which is at right angles to the axis of the optical system used in the tube 7. As here shown the glass envelope of the cell is blackened out with the exception of that portion 21 which is in front of the light sensitive cathode. The light pick-up of the cell is thus confined to a fairly small solid angle of collection. With such a geometry of illumination it is evident that variations in the absorption of light by the sample or in the intensity distribution of the light reflected by the sample will, insofar as such variations are due solely to variations in the finish, contour, or texture of the reflecting surface of the sample under test, be entirely eliminated as error introducing factors in the measurement of the color of the sample in terms of the light reflected therefrom under test conditions.

Figure 2:
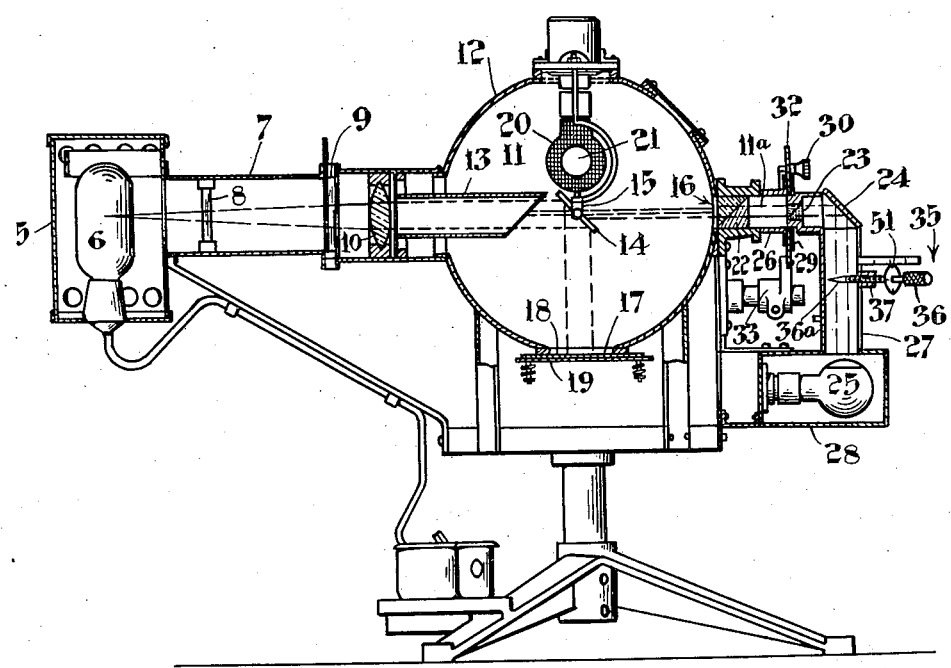
Figure 2 is a longitudinal sectional view of the instrument.
Figure 3:
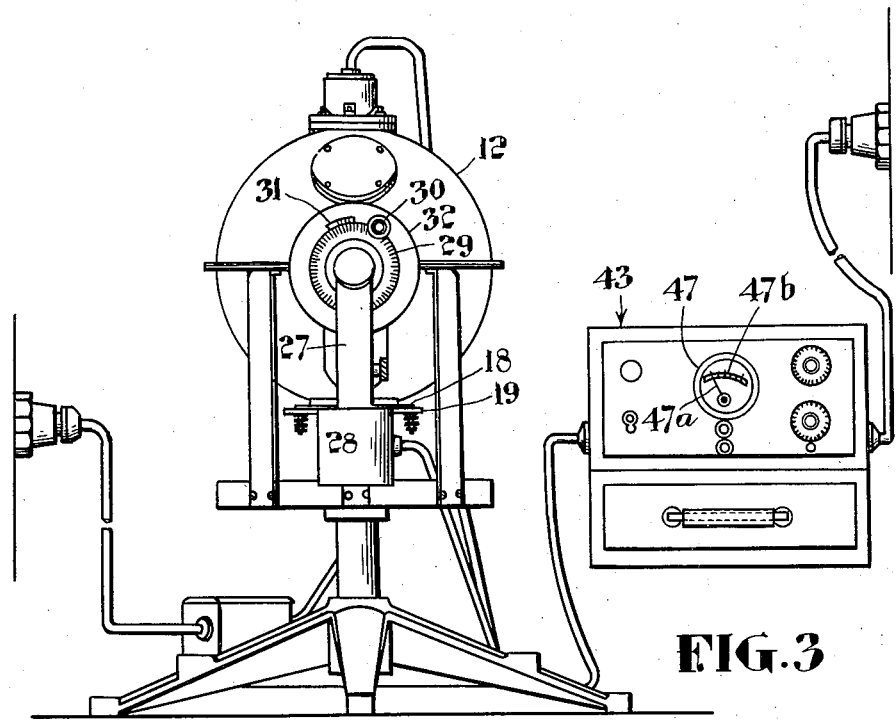
Figure 3 is a front elevation.

That part of the light of the beam 11 which passes through the mirror opening 15 and out through the sphere opening 16 enters a polarizing prism 22 from whence it emerges as a plane polarized beam 11a which continues on through an analyzing prism 23 and falls on a deflecting mirror or prism 24 by which it is deviated 90° toward the light sensitive portion of a second photo-electric cell 25 hereinafter termed the comparator cell. As here shown the prisms 22 and 23 are arranged in a horizontal tube 26 which is blackened on the inside and has one end secured to the sphere 12 so that this tube is in substantial axial alignment with the tube 7. The mirror or prism 24 is located at the intersection formed by the outer end of the tube 26 and the upper end of a vertical tube 27, the latter being blackened on the inside and having its lower end secured to a casing 28 containing the comparator cell 25. The analyzing prism 23 is mounted in the tube 26 so that this prism may be rotated about its axis by means of a graduated circular scale 29 secured thereto. The scale 29 is provided with an operating knob 30 and may be calibrated in degrees of rotation or percentage of light transmission. The scale 29 is rotated relative to the graduations 31 (compare Figs. 2 and 3) on a suitable stationary dial plate 32 which may be supported in proximity to the scale by any suitable form of supporting bracket such as that indicated at 33.

The function of the prism combination represented by the polarizing prism 22 and the analyzing prism 23 is to enable the light transmitted to the comparator cell 25 to be varied from zero transmission at one end of the rotation of analyzing prism 23 to full transmission at the other end. In conjunction with this prism arrangement it is desirable to provide an auxiliary compensating shutter generally indicated at 35. In the present instance I have shown a form of micrometer light shutter comprising a rod 36 which is threaded through a supporting sleeve 37 so that the inner end of the rod projects into the vertical tube 27 and may be moved into or out of the light beam 11a by turning the rod in the proper direction. The inner end of this rod which is adapted to be moved into and out of the light beam 11a is tapered as at 36a so that movement of this tapered portion within the beam causes the light falling on the comparator cell 25 to be shuttered very gradually.

As hereinafter explained, there is a definite position which the tapered end of the rod 36 must occupy in the light beam 11a for any given filter or combination of filters 9 interposed between the lamp 5 and the condenser lens 10 in order to obtain complete cut off for all spectral colors at the true angular rotation cut off point of the analyzing prism 23.

Figure 4:
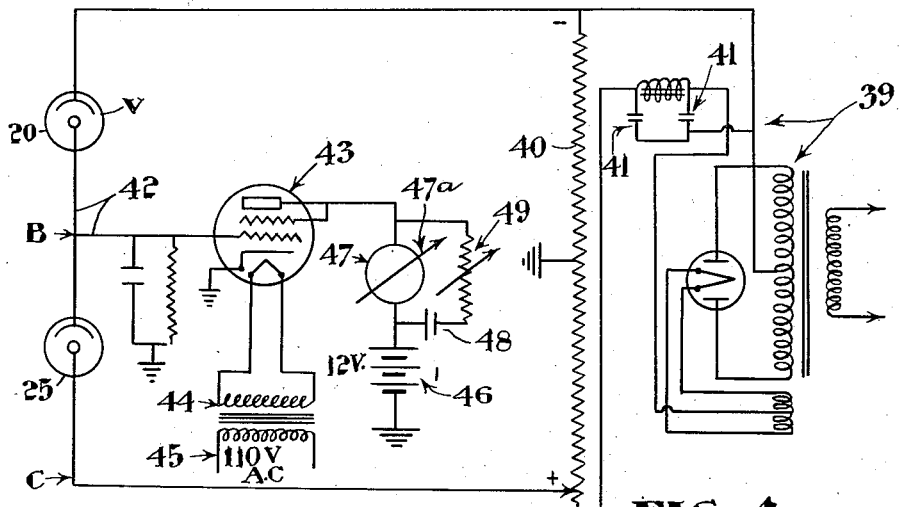
Figure 4 is a wiring diagram showing the manner in which the light sensitive cells are connected in circuit with a power supply and with a measuring meter.

As shown in Fig. 4 the cells 20 and 25 are connected in series across a conventional power supply 39 which conforms to usual radio standards and serves to provide direct current, of a voltage value of approximately 200 volts, across the two cells. It will be noted that the cells are also connected in series with each other across a resistance or voltage divider 40 which determines the maximum voltage across the cells and also serves to smooth out fluctuations of the energy supplied to the cell circuit. The resistance 40 also obviates accidental shock to the operator of the instrument since it provides what may be termed a shunt path for the discharge from the condensers 41 in the supply circuit when the latter is open circuited.

The cells 20 and 25 are of the resistance type in which the electrical resistance of the cell is an inverse function of the incident radiant energy. In other words, these cells vary their internal resistance in proportion to the intensity of light falling thereon so that the potential drop due to an increase of current flowing through the cells in series will vary in relative proportion to the light intensity on the individual cells. As indicated at 42, the cells are connected to the grid of a vacuum tube amplifier 43 so that the grid is provided with a steady direct current voltage whose value depends on the relative distribution of voltage across the two cells. If the light falling on cell 20 is the same as that falling on cell 25 equal currents will flow through the cells and the direct current voltage drop across each cell will be the same. If the light falling on cell 20 becomes greater than that falling on cell 25 additional current will tend to flow in cell 20. However, since the two cells are in series this increase in current must also flow in cell 25 but as cell 25 is not receiving sufficient light to permit this current flow it is obvious that the only way in which this increased current can flow in cell 25 is for the voltage across cell 25 to increase. In order for this increase in voltage across the cell 25 to occur there must be a corresponding decrease of voltage across cell 20 with a resulting decrease of current. The net result of all this is that when light on cell 20 increases it occasions only a small current increase with a large change in the voltage distribution between the cells. This change of voltage distribution can be measured by measuring the voltage across points B and C and is thus an indication of the division of light between the two cells. The amplifier 43 serves as a vacuum tube voltmeter for this purpose and it is important that the amplifier input circuit should have a high resistance so that it does not disturb the photoelectric cell network or cause loss of sensitivity in the measurement of the voltages.

The filament of the amplifier 43 is supplied from the output of a separate transformer 44 which steps down the voltage from the 110 volt supply 45 to a suitable value for the amplifier tube.

The anode of the amplifier tube is supplied with direct current voltage from a separate battery 46 of approximately 12 volts. An 0–100 microamp. direct current meter 47 is included in the anode circuit of the amplifier and the normal anode current flowing through this meter is bucked out by means of a bucking out circuit including a 1.5 volt cell 48 in series with a variable rheostat 49. The value of the steady anode current, as registered by the meter 47 when both the cells have a definite amount of light falling thereon, is determined by the value of the grid resistance which fixes the steady bias voltage on the amplifier tube.

The instrument described herein is operated in the following manner: A white magnesium oxide standard (not shown) is set into the sample holding table 19 so that this standard may be initially arranged over the sphere opening 17 and exposed to the light reflected from mirror 14. The analyzing prism 23 is then rotated to 90° so that it passes the maximum amount of light onto the cell 25. The bucking out circuit of the amplifier 43 is then adjusted to bring the pointer 47a of the anode circuit meter 47 to mid scale or to some other intermediate point on the scale 47b (see Fig. 3). After noting the meter reading the sample to be tested is placed on the table 19 so that it covers the magnesium oxide standard and is substituted therefor as the light reflecting medium. As the light reflecting coefficient of most materials is lower than that of magnesium oxide for any color the photoelectric cell 20 now receives less light than it did when the magnesium oxide standard was exposed to the light reflected from the mirror 14. This causes a disproportional ratio of voltages between cells 20 and 25 as related to the previous condition with the standard in place and this, in turn, manifests itself as a change in voltage applied to the input of the amplifier 43 which results in the pointer of the meter 47 being moved from the mid-scale position. The pointer of the meter is then restored to its previous mid-scale position by rotating the analyzing prism 23 to decrease the light falling on cell 25 by an amount equal to the loss of light experienced on cell 20 as the result of substituting the sample for the magnesium oxide standard. When the pointer of the meter is restored to its original reading the amount of angular rotation of the prism 23 required to bring this about is noted by reference to the prism scale 29. The percent of light attenuation necessary to restore the meter to its original reading is computed and represents the difference in light reflectance between the standard and the sample under test.

The use of the herein described prism combination for controlling the amount of light delivered to cell 25 enables greater stability of calibration to be obtained as compared with the use of mechanical shutters for the same purpose. Another advantage of the prism combination is that, regardless of the amount of light transmitted by the prism combination, it is always using all the light received through the light exit opening 16 of the sphere.

In instruments of the type described herein the lamp which provides the source of illumination of the sample undergoes considerable deterioration. Filaments which operate at high color temperatures become distorted as related to their supports and, as a result, light beams which are collimated therefrom undergo considerable changes in the intensity of distribution over the cross section of the collimated beam. Where such beams are taken through comparator devices, such as screw micrometer actuated shutters or the like, the intensity of the light transmitted past the shutter for a given shutter aperture may vary from time to time. Unfortunately, this phenomenon does not manifest itself as a total error in calibration causing the comparator scale to be biased by a fixed amount in either positive or negative direction, but results in the comparator scale becoming irregularly disposed with local errors in various portions of the scale. This difficulty does not arise when Nicol polarizing prisms are used as described herein as a means of attenuating light in the comparator field.

The instrument described herein is designed so that the comparator light beam which reaches the light polarizing prisms is already filtered by means of the spectral filter or filter combination 9. If, for the time being, we neglect the effect of the sample under measurement and merely consider this filtered light which reaches cells 20 and 25 we note that in the case of cell 25 its share of this filtered light has to pass through the prism combination. Thus, if the prism combination exhibits special selective spectral transmission characteristics, it follows that cells 20 and 25 are going to be unequally influenced by the different colors of light, to which they are exposed. In this connection the spectral sensitivity responses of the photo cells may be disregarded since they both have the same curve. It therefore follows that if the prism combination exhibits pronounced spectral discrimination between various filtered lights in the beam transmitted thereto, this must be compensated for by the provision of a suitable shutter device in order that the prism combination may effectively accomplish its function of varying the light transmitted to cell 25 from zero transmission at one end of the rotation of analyzing prism 23 to full transmission at the other end. In this connection it may also be explained that, in setting up the initial calibration of the instrument described herein, there are two important spectral correcting operations. One of these relates to spectral corrections to be made for the photo cell response itself, and the other to correcting for small spectral differences as imposed by the prism combination.

For purposes of calibration the maximum reflection of light obtainable within the sphere 12 is considered to be that obtained from a smoked magnesium oxide coated plate when the latter is placed over the intermediate opening 17 for calibration purposes. The reflection here obtained is regarded as 100% for any spectral quality of light to which the magnesium oxide coated plate is exposed. As the spectral characteristic of the photo cells exhibits a sensitivity at the red end of the spectrum about 4 times greater than that at the blue end, neutral wire screens are used in conjunction with the filter or filters 9 to even out the quantity of light transmitted by the filters onto the cells for the various filters employed. While the use of such fixed screens does not allow the adjustment of light level to the finest degree it does make it possible to adjust the light level within three or four per cent which is quite sufficient as far as the general illumination of the sample is concerned. However, on the comparator path, the spectral response in cell 25 must be very accurately controlled and this poses the problem of obtaining complete cut off for all spectral colors on the comparator path at the true angular cut off points of the prisms.

We will assume, for example, that when using either red, green, or blue filters, suitable filter screens are used in conjunction with the filters so that the same amount of light will always pass in its passage toward cells 20 and 25. Under these conditions, it will be found that for the same foot-candle intensity of the various color lights reaching prism 22 zero transmittance of all the colors does not occur at the same angular point of rotation of the analyzing prism 23. In some instances cut off of one color occurs above the true cut off point of the analyzing prism whereas, in other cases, when cut off of one color is obtained at the proper point it may be impossible to get cut off of the other color when the minimum transmission point of the analyzing prism is reached.

As previously stated these spectral differences imposed by the use of the prism combination are corrected out by the provision of the micrometer light shutter indicated at 35. The design and arrangement of this shutter is such that for any given filter combination provided at 9 the tapered portion 36a of rod 36 must be adjusted to a definite position in the path of the light beam passing from the mirror 24 to the cell 25. An indicator 51 is fixed to the rod 36 and bears appropriate markings for the respective filters 9 employed with the instrument.

Lamps used as the source of illumination for instruments of the character described herein are subject to what are known as color temperature changes which tend to produce a complete change in the spectral quality of the light produced by the lamp. These changes may be caused by variations of the voltage and current applied to the lamp filament or by changes in the resistance of the filament itself. When monochromatic filters are employed to filter the total light output of the lamp and to restrict the light falling on the sample to a very narrow spectral range, the effect of the lamp color temperature variation is not appreciable. On the other hand, when using trichromatic filters of fairly wide transmission factors, the lamp color temperature changes may modify the spectral qualities of the light transmitted by the filters and may impair the constancy of calibration of the instrument.

Figure 5:
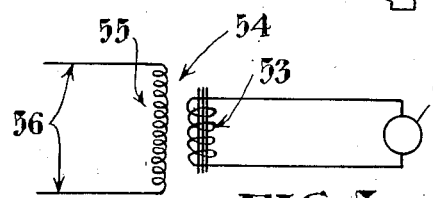
Figure 5 is a wiring diagram of a lamp circuit.

In the particular instrument described herein the introduction of errors due to lamp color temperature changes, is largely avoided by maintaining the current supplied to lamp 6 at a constant value. This may be accomplished, as shown in Fig. 5, by connecting the lamp 6 across the secondary 53 of a constant current transformer 54, the primary 55 of which is connected to a suitable supply source generally indicated at 56.

Having thus described my invention, what I claim is:

1. A measuring instrument of the character described comprising a light-integrating sphere provided with oppositely disposed light admission and exit openings and an intermediate opening, means for holding a sample in place over said intermediate opening, means for projecting a concentrated beam of light through the light admission opening and across the sphere to the light exit opening, a photoelectric cell arranged exteriorly of the sphere with its light sensitive portion exposed to the light transmitted through said exit opening, light dividing means centrally arranged in said sphere so that a portion of the light of said beam passes through said light dividing means to the exit opening while another portion of said light is reflected by the light dividing means and falls on said sample, a second photoelectric cell arranged in said sphere so that said light dividing means is interposed between said cell and said intermediate opening and means, including said cells, for measuring the light reflected from the sample.

2. An instrument as set forth in claim 1, in which the light projecting means includes an electric lamp and a lamp energizing circuit including means for maintaining the current supplied to said lamp at a constant value.

3. An instrument as set forth in claim 1, in which the light projecting means is located exteriorly of the sphere and comprises a light souce, a condenser lens and color filters interposed between said light source and said lens.

4. An instrument as set forth in claim 1 including adjustable light controlling means for controlling the amount of light passing from the exit opening of the sphere to the first mentioned cell.

5. An instrument as set forth in claim 1 including light controlling means for varying the amount of light passing from the exit opening of the sphere to the first mentioned cell, said means comprising a polarizing prism and an analyzing prism.

6. An instrument as set forth in claim 1 including a polarizing prism and an analyzing prism interposed between the exit opening of the sphere and the first mentioned cell so that the amount of light passing from said opening to said cell may be varied by rotating the analyzing prism about its axis and means for compensating for selective spectral transmission characteristics exhibited by said prisms.

7. An instrument as set forth in claim 1 including a polarizing prism positioned adjacent the exit opening of the sphere, an analyzing prism interposed between the polarizing prism and the first mentioned cell and a compensating light shutter interposed between the analyzing prism and said first mentioned cell.

8. An instrument as set forth in claim 1 in which the light projecting means comprises a source of light, a condenser lens interposed between said source of light and the light admission opening of said sphere, color filters interposed between said light source and said lens and a shield tube through which the beam of light emerging from the condenser lens passes into said sphere, said tube serving to prevent any stray light from the lens striking any part of the interior of the sphere wall.

9. A measuring instrument of the character described comprising a light-integrating sphere provided with oppositely disposed light admission and exit openings and an intermediate opening, means for holding a sample in place over said intermediate opening, means for projecting a concentrated beam of filtered light through the light admission opening and across the sphere to the light exit opening, said means comprising a source of light, a condenser lens interposed between said source of light and said light admission opening and color filters interposed between said source of light and said lens, a photoelectric cell arranged exteriorly of the sphere with its light sensitive portion exposed to light transmitted through said exit opening, light dividing means centrally arranged in said sphere so that a portion of the light of said beam is transmitted by said light dividing means to the exit opening while another portion of said light is reflected by the light dividing means and falls on said sample, a second photoelectric cell arranged in said sphere so that the light dividing means is interposed between said cell and said intermediate opening, axially aligned polarizing and analyzing prisms interposed between the exit opening of the sphere and the first mentioned photoelectric cell to provide a means of varying the amount of light falling on said first mentioned cell and an adjustable light shutter interposed between the prisms and said first mentioned cell to provide a means of compensating for special selective spectral transmission characteristics exhibited by said prisms and means, including said cells and prisms, for measuring the light reflected by the sample as related to the amount of light reflected back into the sphere when a standard reflector is arranged over the intermediate opening of the sphere and is exposed to the light reflected from said light dividing means.

10. A measuring instrument of the character described comprising a light-integrating sphere provided with oppositely disposed light admission and exit openings and an intermediate opening, means for holding either a standard reflector or a sample under test in place over said intermediate opening, means including color filters for projecting a concentrated beam of filtered light through the light admission opening and across the sphere to the light exit opening, a photoelectric cell of the resistance type arranged exteriorly of the sphere with its light sensitive portion exposed to the light transmitted through said exit opening, light dividing means centrally arranged in said sphere so that a portion of the light of said beam is transmitted by said light dividing means to the exit opening while another portion of said light is reflected by the light dividing means towards said intermediate opening, adjustable means for varying the amount of light delivered from said exit opening to said cell, a second photoelectric cell of the resistance type arranged in said sphere so that the light dividing means is interposed between said second cell and said intermediate opening, a power supply, means connecting said cells in series with each other across the output terminals of said power supply, an amplifier tube connected to the cells so that the voltage applied to the grid of the amplifier varies in response to variations of the internal resistance of the cells, means for energizing the filament of the amplifier from a source of energy other than that across which the cells are connected in series, an additional source of energy connected in circuit with the anode element of said amplifier and with a meter or indicating instrument which operates in response to changes in the voltage distribution between the cells to give an indication of the division of light between the two cells which is responsible for such voltage changes.

DOUGLAS L. WEST.